UNITED STATES PATENT OFFICE.

WILLIAM D. RICHARDSON, OF CHICAGO, ILLINOIS, ASSIGNOR TO SWIFT & COMPANY, OF CHICAGO, ILLINOIS, A CORPORATION OF ILLINOIS.

PROCESS OF HYDROGENATING OILS OR FATS.

1,175,905.

Specification of Letters Patent. Patented Mar. 14, 1916.

No Drawing. Application filed November 11, 1912. Serial No. 730,748.

*To all whom it may concern:*

Be it known that I, WILLIAM D. RICHARDSON, a citizen of the United States of America, and a resident of Chicago, county of Cook, and State of Illinois, have invented certain new and useful Improvements in Processes of Hydrogenating Oils or Fats, of which the following is a specification.

The object of this invention is to provide an improved method of hydrogenating oils or fats to harden or solidify them. This object is accomplished by the following described process: I first put in a suitable container a quantity of fat solvent which may be ether or other suitable oil or fat solvent. Two metallic pieces are then submerged in this material and connected with a suitable device for supplying an electric current through said pieces. These pieces serve as electrodes, being suitably spaced apart and provided with sufficient current to produce an electric arc across the gap between them and to cause part of the metal of said electrodes to disintegrate and become precipitated or suspended in finely divided form or in colloidal solution or suspension in the said fat solvent. The electrodes suitable for this purpose may be nickel, copper, platinum, palladium, iron, or their alloys, or other metals or alloys. These electrodes may be conveniently used in the form of rods and the electric current may be operated by a hand feed or an automatic arc lamp mechanism in which the rods are clamped. The rods may be entirely or partly submerged in the fat solvent. The electric current is operated preferably at a voltage of from 40 to 150 and is preferably a direct current. The arc is allowed to continue until the desired amount of disintegrated or finely divided metal has been produced in the fat solvent. This gives a material consisting of a colloidal suspension or solution of the metal, as for instance nickel, in a liquid, such as ether, freely miscible with oil. This liquid serves to protect the disintegrated metal from the air and also makes the material fluid and easily handled. Violatile liquids, such as ether, serving as a vehicle in this operation can be readily removed from the oil by volatilization; by evaporating it out of the hot liquid. The desired quantity of the resultant material is then added to the oil or fat to be hydrogenated and mixed therewith. For this purpose a sufficient amount of the fat solvent containing the disintegrated metal is used to add to the oil or fat to be hydrogenated, about from 1 to 3 per cent. by weight, of the disintegrated metal. More or less may be used if desired. The greater the percentage of the disintegrated metal used, the faster the hydrogenation proceeds. Hydrogenation is done by hydrogen, or a gas containing hydrogen, introduced into the mass containing the metal, introduction being advantageously under pressure. The mixing and hydrogenation are advantageously done in a tank or container fitted with an agitating or spraying device and capable of being heated to a temperature of 150 to 200 degrees C., or thereabout, and adapted to permit the contents to be mixed under pressure.

When hydrogenating under about 40 pounds pressure and with a temperature of about 160 degrees C. the process of hardening or solidifying of the oil or fat may be completed in from one to eight hours, depending upon the percentage of the finely divided metal used, the kind of fat or oil being hardened, the rapidity of agitation, etc., and upon the degree of hardness desired.

After the hydrogenation of the oil or fat is accomplished the fat solvent, or part thereof, is removed by evaporation. The finely divided metal may be removed from the mass as by straining, or in some cases it may be permitted to remain in the oil or fat.

Cross reference is hereby made to my copending applications, Serial Nos. 730,745, 730,746, 730,749, and 26,305, in which are described and claimed certain features of invention relating to catalyzers and fat hydrogenating processes more or less disclosed but not fully claimed herein.

I claim:—

1. The process of hydrogenating oil or fat which consists in producing an electric arc between metallic electrodes submerged in a volatile liquid miscible with fat and a solvent thereof and thereby disintegrating part of the metal and causing it to enter the fat solvent in finely divided form, then mixing the resultant combined substance, with the fat or oil to be hydrogenated and hydrogenating and then removing the fat solvent.

2. The process of hydrogenating oil or fat which consists in producing an electric arc between metallic electrodes submerged in a volatile liquid miscible with fat and a solvent thereof and thereby disintegrating part of the metal and causing it to enter the fat solvent in finely divided form, then mixing the resultant combined substance, with the fat or oil to be hydrogenated and hydrogenating and then heating the mass until the fat solvent has been removed by evaporation.

3. The process of hydrogenating oil or fat which consists in producing an electric arc between metallic electrodes submerged in a volatile liquid miscible with fat and a solvent thereof and thereby disintegrating part of the metal and causing it to enter the fat solvent in finely divided form, then mixing the resultant combined substance, with the fat or oil to be hydrogenated and hydrogenating and then removing the fat solvent and then removing the disintegrated metal.

4. The process of hydrogenating oil or fat which consists in producing an electric arc between nickel electrodes submerged in a volatile liquid miscible with fat and a solvent thereof and thereby disintegrating part of the nickel and causing it to enter the fat solvent in finely divided form, then mixing the resultant combined substance with the fat or oil to be hydrogenated and hydrogenating, and then removing the fat solvent.

5. The process of hydrogenating oil or fat which consists in producing an electric arc between nickel electrodes submerged in a volatile liquid miscible with fat and a solvent thereof and thereby disintegrating part of the nickel and causing it to enter the fat solvent in finely divided form, then mixing the resultant combined substance with the fat or oil to be hydrogenated and hydrogenating and then heating the mass until the fat solvent has been removed by evaporation.

6. The process of hydrogenating oil or fat which consists in producing an electric arc between nickel electrodes submerged in a volatile liquid miscible with fat and a solvent thereof and thereby disintegrating part of the nickel and causing it to enter the fat solvent in finely divided form, then mixing the resultant combined substance with the fat or oil to be hydrogenated and hydrogenating and then removing the fat solvent and then removing the disintegrated nickel.

Signed at Chicago this 25 day of October 1912.

WILLIAM D. RICHARDSON.

Witnesses:
I. O. BEATTY,
ARTHUR CORBISHLEY.